US010514453B2

(12) United States Patent
Hesse et al.

(10) Patent No.: US 10,514,453 B2
(45) Date of Patent: Dec. 24, 2019

(54) RADAR DEVICE

(71) Applicant: Hella KGaA Hueck & Co., Lippstadt (DE)

(72) Inventors: Thomas Hesse, Paderborn (DE); Jürgen Köhler, Möhnesee (DE)

(73) Assignee: Hella GmbH & Co. KGaA, Lippstadt (DE)

(*) Notice: Subject to any disclaimer, the term of this patent is extended or adjusted under 35 U.S.C. 154(b) by 186 days.

(21) Appl. No.: 15/550,485

(22) PCT Filed: Mar. 3, 2016

(86) PCT No.: PCT/EP2016/054543
§ 371 (c)(1),
(2) Date: Aug. 11, 2017

(87) PCT Pub. No.: WO2016/139306
PCT Pub. Date: Sep. 9, 2016

(65) Prior Publication Data
US 2018/0031688 A1 Feb. 1, 2018

(30) Foreign Application Priority Data
Mar. 4, 2015 (DE) .................. 10 2015 103 149

(51) Int. Cl.
G01S 13/34 (2006.01)
G01S 7/35 (2006.01)
(Continued)

(52) U.S. Cl.
CPC ............. *G01S 13/343* (2013.01); *G01S 7/35* (2013.01); *G01S 7/4008* (2013.01); *G01S 13/347* (2013.01); *G01S 13/931* (2013.01)

(58) Field of Classification Search
CPC .... G01S 13/343; G01S 13/931; G01S 13/347; G01S 7/35; G01S 7/4008
(Continued)

(56) References Cited
U.S. PATENT DOCUMENTS

2005/0104634 A1* 5/2005 Fujishima ............ H03D 7/1441
327/117
2006/0103003 A1* 5/2006 Heide ................. H01L 23/3135
257/700
(Continued)

FOREIGN PATENT DOCUMENTS

DE      19810822 A1     9/1998
DE   102005053442 A1     5/2007
(Continued)

OTHER PUBLICATIONS

Williams, D. A. "A highly linearised mm-wave voltage controlled oscillator for FMCW radar applications." Solid State Components for Radar, IEE Colloquium on. IET, 1988.
(Continued)

*Primary Examiner* — Bo Fan
(74) *Attorney, Agent, or Firm* — Husch Blackwell LLP

(57) ABSTRACT

A radar device for transmitting a signal in a frequency range with a control system and an oscillator. An input of the oscillator is connected to the control system via a converter. The oscillator can be activated by the control system to generate the signal and the signal generated by the oscillator can be tapped at an output of the oscillator, with at least one transmission antenna for transmitting the signal at the output of the oscillator. The transmission antenna is connected to the output of the oscillator, with at least one receive channel for receiving a receive signal, for processing the receive signal and for forwarding the processed receive signal to the control system. The receive channel features at least one receive antenna and a mixer for mixing the receive signal
(Continued)

with the signal at the output of the oscillator. The mixer is connected to the output of the oscillator. A frequency divider is provided that feeds signals from the oscillator to a frequency counter. At a minimum, the oscillator and the frequency divider are designed as a monolithic microwave integrated circuit.

8 Claims, 6 Drawing Sheets

(51) Int. Cl.
*G01S 7/40* (2006.01)
*G01S 13/93* (2006.01)

(58) Field of Classification Search
USPC .......................... 342/196, 173, 83, 195, 128
See application file for complete search history.

(56) References Cited

U.S. PATENT DOCUMENTS

2009/0195321 A1    8/2009  Saunders
2015/0192662 A1*   7/2015  Hesse .................. G01S 7/4008
                                                    342/196

FOREIGN PATENT DOCUMENTS

DE    102011055693 A1    5/2013
DE    102012106506 A1    1/2014
EP        0945715 A2     9/1999

OTHER PUBLICATIONS

Almorox-Gonzalez, Pablo, et al. "Millimeter-wave sensor with FMICW capabilities for medium-range high-resolution radars." IEEE Transactions on Microwave Theory and Techniques 57.6 (2009): 1479-1486.

* cited by examiner

RADAR DEVICE

CROSS REFERENCE

This application claims priority to PCT Patent Application No. PCT/EP2016/054543, filed 3 Mar. 2016, which itself claims priority to German Application No. 10 2015 103149.3, filed 4 Mar. 2015, the entirety of both of which are hereby incorporated by reference.

FIELD OF THE INVENTION

This invention consists of a radar device and a procedure for operating a radar device.

BACKGROUND OF THE INVENTION

Radar devices are being used with increasing frequency in vehicles to perform functions such as detecting objects in the vehicle vicinity and controlling vehicle equipment. This allows, for example, driver assistance systems to be provided which utilize data from the radar device to support the driver in braking or changing lanes.

The design of the frequency response curve is crucial to the target detection performed by a 24 GHz radar device that emits transmission signals in the 24 GHz range, for example. Usually, the transmission frequency of the transmission signal scans a specified bandwidth of 200 MHz using a roughly linear type of what are called chirps, which are frequency ramps with increasing transmission frequency. In modern radar devices, the gradient of these chirps is relatively low. Therefore, the time required for modern radar devices to scan 200 MHz is approximately 40 ms.

However, the general trend is clearly in the direction of substantially higher gradients. The reduction of the duration of a chirp to about 75 µs along with a higher scanning rate of the order of 1 MHz substantially improve target detection. Stringent requirements must be placed on the tuning voltage curve of the 24 GHz VCO (voltage-controlled oscillator) in order to achieve a linear transmission frequency curve in the presence of such high chirp gradients.

In the current state of technology, PLLs (phase-locked loops) are used to generate tuning voltage. As such, they combine with the VCO to create a closed control loop. However, this phase-locked loop entails extra costs that ideally should be avoided.

SUMMARY OF THE INVENTION

The purpose of this invention is to create a radar device and a procedure for operating a radar device that enables affordable operation and manufacture, even for chirps with a high gradient, and can ensure that the frequency response curve is highly linear, enabling increased quality of target detection.

One embodiment of this invention is a radar device for transmitting a signal in a frequency range with a control system and an oscillator, wherein an input of the oscillator is connected to the control system via a converter, the oscillator can be activated by the control system to generate the signal and the signal generated by the oscillator can be tapped at an output of the oscillator, with at least one transmission antenna for transmitting the signal at the output of the oscillator, wherein the transmission antenna is connected to the output of the oscillator, with at least one receive channel for receiving a receive signal, for processing the receive signal and for forwarding the processed receive signal to the control system, wherein the receive channel features at least one receive antenna and a mixer for mixing the receive signal with the signal at the output of the oscillator, wherein the mixer is connected to the output of the oscillator, wherein a frequency divider is provided that feeds signals from the oscillator to a frequency counter, wherein, at a minimum, the oscillator and the frequency divider are designed as a monolithic microwave integrated circuit. This ensures that, for the most part, all nonlinearities that occur when implementing a digital sequence in a frequency response curve at 24 GHz can be detected by equipment and offset. The linearity of the generated fast chirps is also increased, which improves target detection. This is achieved by using hardware to generate fast chirps in an economical manner, rendering the use of a programmable PLL module unnecessary.

It is also advantageous if at least one receive channel mixer remains integrated in the monolithic microwave integrated circuit. This can simplify manufacturing and signal analysis.

It is also advantageous if at least one receive channel amplifier and/or filter remains integrated in the monolithic microwave integrated circuit.

It is particularly advantageous if a calibration cycle that utilizes a tuning voltage and VCO frequency response curve identical to the voltage in a radar measurement cycle can be implemented for calibration using the frequency count from the frequency counter. This has the benefit that frequency counting can be carried out even for fast chirps.

It is particularly advantageous if an activation device is provided for controlling the frequency divider, which can also be used to toggle the integrated frequency divider between at least two different division factors. This allows an adjustment to be made to improve accuracy.

It is advantageous if the activation device is designed as an interface for a digital signal processor. In this case, the digital signal processor can achieve targeted activation.

One embodiment of this invention is a procedure for operating a radar sensor, wherein a calibration cycle that utilizes a tuning voltage and VCO frequency response curve identical to the voltage in a radar measurement cycle can be implemented for calibration using the frequency counter.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
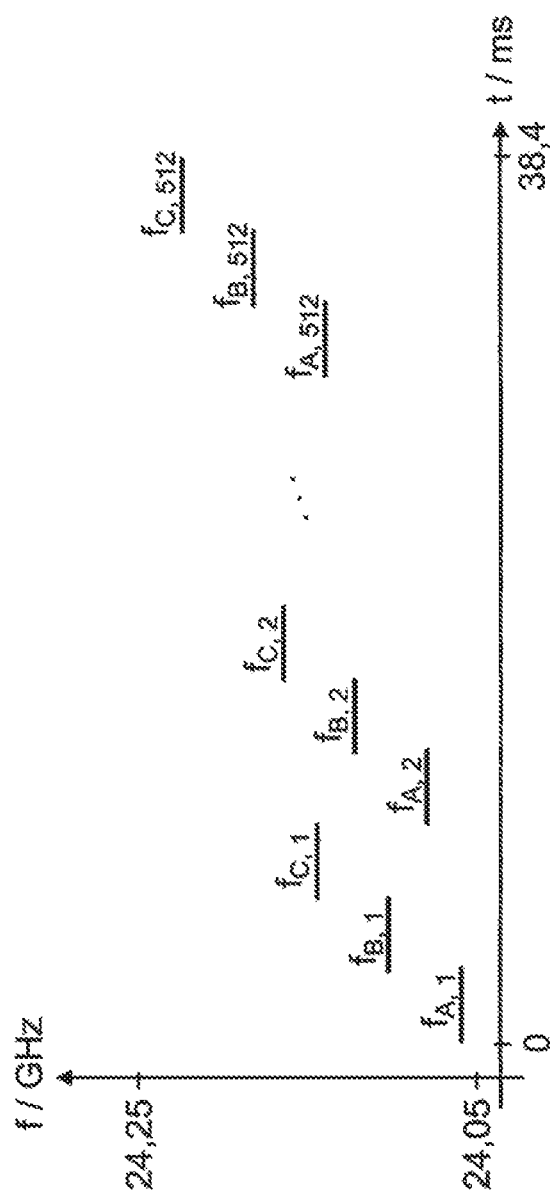
FIG. 1 is a schematic diagram of a transmission signal as a function of time.

FIG. 1 shows a diagram with a transmission signal from a radar device using a schematic diagram of an up-chirp (i.e. a rising transmission signal ramp with increasing transmission frequency). In current radar devices, the transmission signal is designed to have frequency chirps with a low gradient. The time it takes to scan 200 MHz within the provided 24 GHz frequency range is 38.4 ms. The LFMSK modulation procedure (shown in the curve below) determines the frequency response curve within a chirp. Three interlaced signals (A, B, C) are transmitted. A constant frequency is transmitted for a period of approx. 25 µs, during a burst or a signal with a fixed number of oscillations and a predefined time period. This frequency yields the following equation for each of the three signals, $$f_{ABC,i} = f_{ABC,0} + i * \Delta f_{ABC} \text{ where } i=0, \ldots, N-1.$$

The number of bursts for each signal (A, B or C) is N=512. A frequency increment of $\Delta f_{ABC} > 0$ indicates an up-chirp, while an increment of $\Delta f_{ABC} < 0$ indicates a down-chirp. A Doppler chirp has the feature $\Delta f_{ABC} = 0$. This means that up-chirps, down-chirps and Doppler chirps are transmitted in an alternating pattern.

A section of an LFMSK signal for an up-chirp is shown in FIG. 1.

The frequency range covered by signals A, B or C respectively within a chirp time of 38.4 ms is typically 190 MHz. The frequency differences $f_{B,i} - f_{A,i}$ and $f_{C,i} - f_{B,i}$ are each 1.2 MHz.

In addition to the regulatory specifications pertaining to the occupied bandwidth around 24 GHz, parameter selection is mainly determined by target detection requirements.

Figure 2:
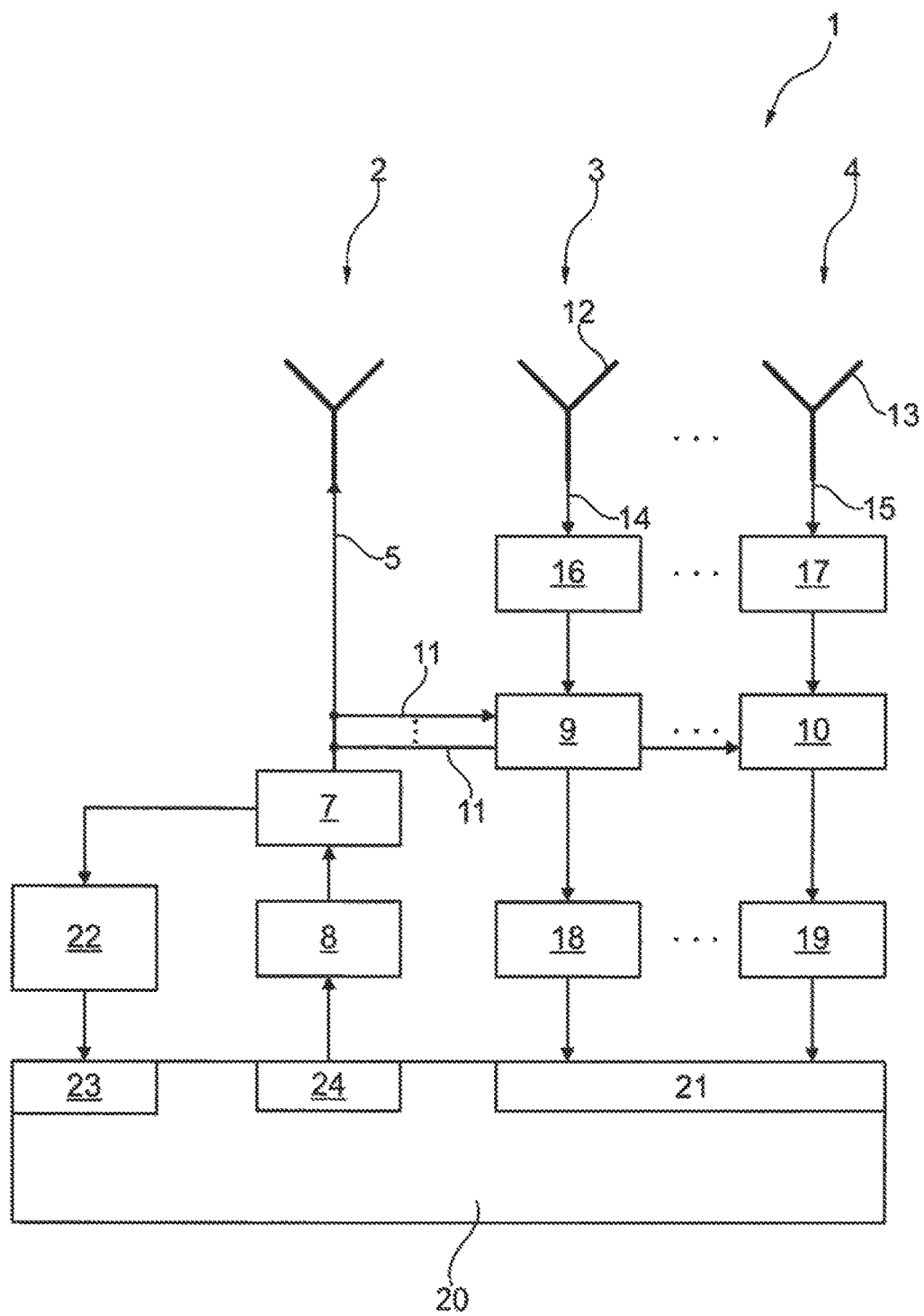
FIG. 2 is a schematic diagram of a radar device.

FIG. 2 shows the design of a radar device (1), such as a radar sensor, with respect to generating transmission signals and receiving receive signals. For this purpose, the radar device (1) features a transmission path (2) and receive channels (3, 4). A digital-analog-converter (8) (DAC) in the transmission path (2) is used to activate a voltage-controlled oscillator (7) (VCO) in order to generate the transmission signal (5) or TX signal in the approximate frequency range of 24 GHz.

A 24 GHz signal with a corresponding frequency offers an equivalent to the analog voltage curve generated by the digital-analog converter (8). This signal is a transmission signal (5) (TX signal) and is also an LO signal (11) fed to the mixers (9, 10) for the receive channels (3, 4). This LO signal (11) mixes the signals (14, 15) received by the receive antennas (12, 13) into the baseband. Beforehand, these signals are amplified by amplifiers (16, 17) (LNA). After mixing, the filters (18, 19) filter the signals, and they are scanned by an analog-digital converter (21) (ADC) integrated in the digital signal processor (20) (DSP). Then, target detection is performed using digital signal processing in the digital signal processor (20) (DSP).

In these radar devices (1), a digital signal processor (20) (DSP) controls the device/sensor. This control process includes transmission signal generation and scanning receive signals (14, 15) from multiple receive antennas (12, 13). Both of these processes are time-dependent on one another. The digital signal processor also performs functions such as receive signal processing and diagnostics for large sensor hardware parts.

With respect to transmission signal generation and scanning receive signals (14, 15), the echelon form of the frequency response curve is characteristic of the LFMSK procedure. After configuring a new transmission frequency, this frequency remains in place for the duration of a burst (25 µs), which means that a steady state can occur in the vicinity of the VCO and the resulting receive signals (14, 15) are scanned at the end of the burst.

Generation of an LFMSK transmission signal (5) and processing by a receiver are shown in FIG. 2 (using the example of a radar device).

A corresponding analog voltage, which is used as tuning voltage for a 24 GHz VCO (7), is generated by programming a DAC or digital-analog converter (8) with a 16-bit value. This method is used to generate a 24 GHz signal with a fixed frequency that corresponds to the 16-bit value. Sequential DAC programming with 3*512 16-bit values, which are stored in a DAC table, is used to generate the transmission signal shown in FIG. 1.

To prevent leaving the intended frequency range in the 24 GHz range, the specified DAC table is not only calculated once, but updated advantageously on a regular basis during operation, because otherwise a frequency range violation could take place, for example due to temperature and aging drift.

The specified update of the DAC table takes place through regular internal frequency counts of the sensor in separate calibration cycles. The core of the concept is the direct, sensor-internal backward measurement of the 24 GHz-VCO frequency. For this purpose, a 24 GHz frequency is configured for a duration of approximately 1 ms. As seen in FIG. 2, the feedback of the signal, which is divided down into multiple stages in the frequency at the digital signal processor (20). To do so, a frequency divider (22) is used to return a signal that is evaluated by the frequency counter (23). During this process, a capture-compare unit features a highly accurate counting of the period duration of the frequency-split signal. The resolution and thus the absolute accuracy of this cycle duration measurement is 6.67 ns, corresponding to the inverse of the DSP cycle of 150 MHz. The entire division factor for the configured 24 GHz frequency is 16*23136*26=9624576 for selected radar devices, resulting in a counting signal with a frequency of 24.15 GHz/9624576=2.509 kHz.

Using the measured cycle duration and the known division factors, this can be used to calculate the actually present 24 GHz frequency. The accuracy of this calculation results from the relative accuracy of the cycle duration measurement in the kHz range, which is given by 6.67 ns|(1/2.509 kHz)=1.6735*10-5. In the case of a 24 GHz frequency of 24.15 GHz, this results in an absolute accuracy of approximately 404 kHz.

Figure 3:
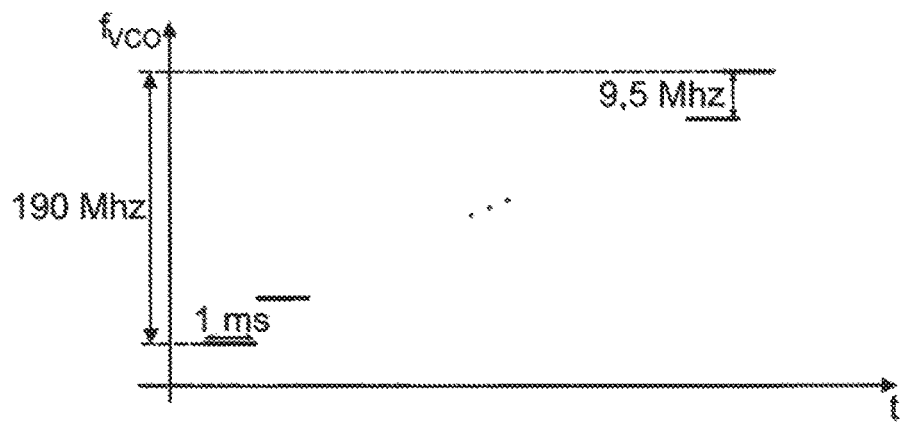
FIG. 3 is a diagram for explaining the invention.

For updating the DAC table, i.e. the table of digital-analog converter (8), it is particularly advantageous to approximate the nonlinear VCO curve that describes the relationship between the set DAC value and the resulting 24 GHz frequency. For this purpose, the frequency count described above for 21 individual frequencies equidistant over the 24 GHz frequency range to be crossed in takes place in accordance with the illustration shown in FIG. 3. Here, FIG. 3 shows the VCO frequency series during a calibration. Using the 21 configured DAC values and the 24 GHz frequencies measured or calculated for this purpose, a regression function is calculated, which is used in turn to update the DAC table for the desired 24 GHz frequencies of an LFMSK chirp.

Figure 4:
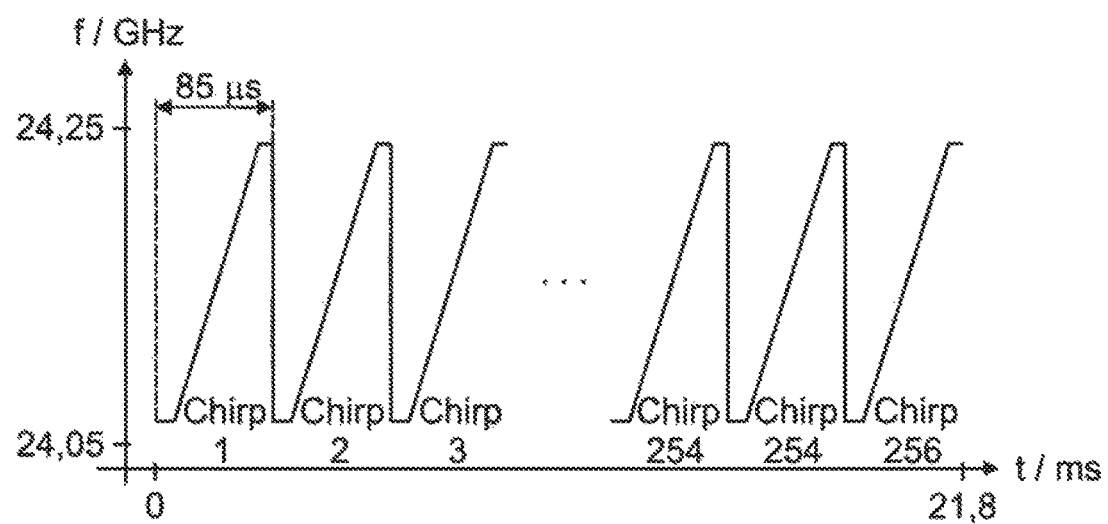
FIG. 4 is a diagram for illustrating fast chirps.

The radar target detection using fast, linear chirps offers significant advantages over slow chirps. One such typical transmission response curve of fast chirps is shown in FIG. 4. FIG. 4 is a schematic rendering of a group of 256 fast chirps, which increase in linear form within 85 µs and then drop in nearly vertical form. The beginning of the end of the rise of the chirp is accompanied by a short plateau, but this is not necessarily present in all cases.

When comparing FIGS. 1 and 4, the difference in the gradients of the frequency chirps is immediately clear. The high gradient of the fast chirps with simultaneously high linearity of the frequency response curve, as shown in FIG. 4, places particular requirements on the hardware-related creation of the transmission signals.

For example, generating the VCO tuning voltage using a DAC (digital audio converter) (8) programmed via an SPI interface (24) is not particularly practical due to the excessive latency times, which are around 10 µs.

To attain short, fast and steep chirps, however, the concept presented above for the modulation of slow chirps is of great interest for the implementation of fast chirps. This modulation involves enabling the desired tuning voltage curve by sequentially setting the values stored in a DAC table and updating this DAC table during operation of the sensor regularly by means of self-calibration.

For this purpose, a problem must be solved. An efficient method for frequency calibration must be found, by means of which the DAC table can be updated such that the fast chirps generated have the desired linear frequency curve.

Figure 5:
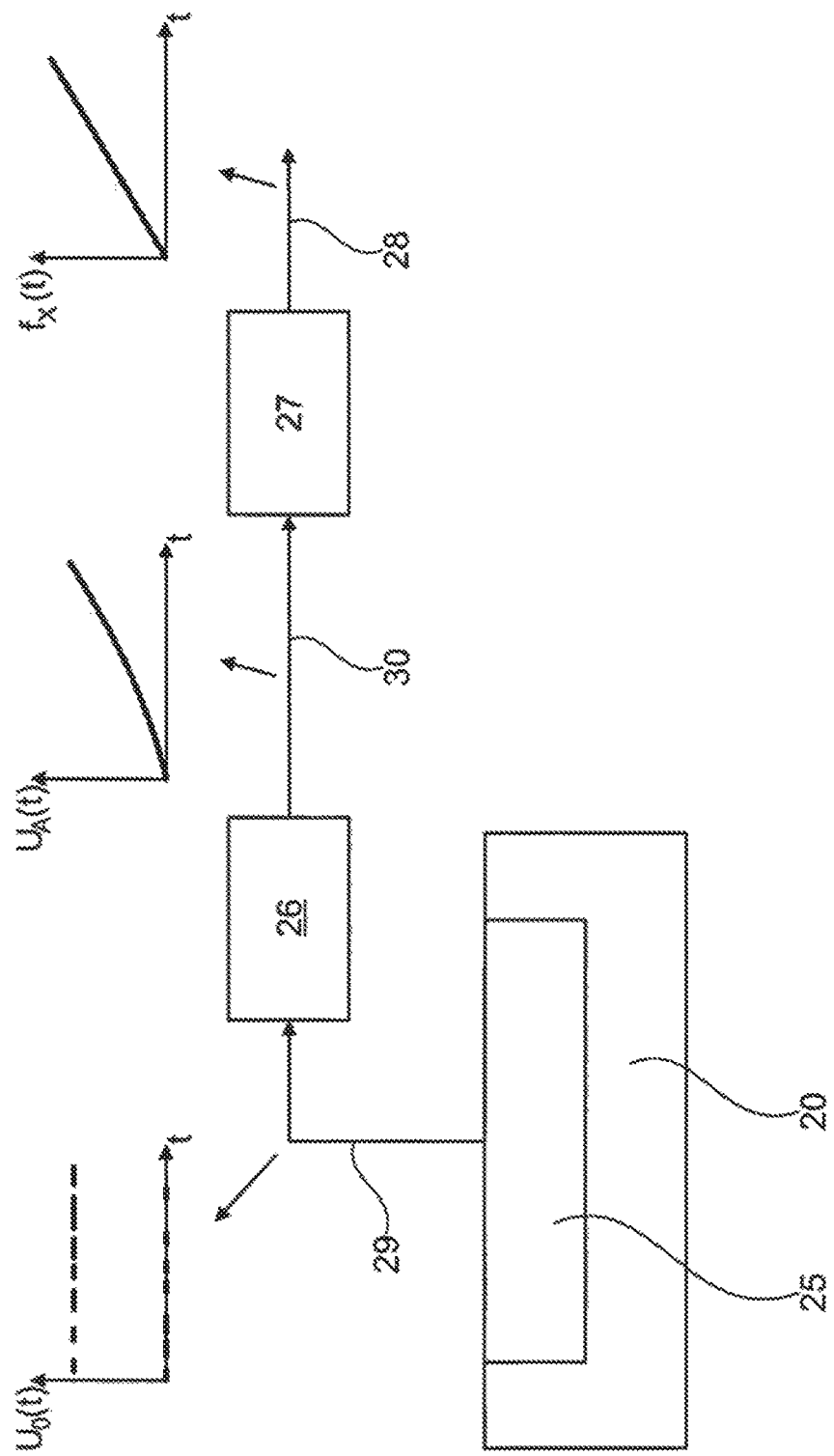
FIG. 5 is a diagram for explaining how a transmission signal is generated.

The generation of the tuning voltage and the resulting transmission signal (28) take place as shown in FIG. 5. A module within the digital signal processor (20) generates a high-rate digital signal from an internal DAC table for which the local frequency (amount) of high levels corresponds to the corresponding value of the DAC table and the voltage level of the tuning voltage desired at this time.

A low-pass filtering of the digital signal (29) using the low-pass filter (26) attains the desired curve of the tuning voltage (30). For this purpose, it is an advantage that this frequency response curve, and thus also the frequency distribution of the digital signal, can include a precorrection that can compensate for the nonlinear curve of the VCO. As a result, a linear curve is obtained in the resulting frequency curve of the transmission signal (28).

Similarly to when generating slow frequency chirps, as shown in FIG. 1, it is beneficial if, when generating the fast chirps, the concept of regular calibration cycles in a which a direct counting of a few 24 GHz frequencies takes place is also pursued.

A high-rate digital sequence is calculated from the results of the count via the calculation of an internal DAC table. The local amplitude frequency of this sequence represents the desired frequency curve, which is then attained by means of low-pass filtering using the low-pass (26).

The calibration concept of counting constant frequencies may cause problems for fast chirps. The process of setting constant frequencies for the relatively high duration of 1 ms, counting them and the DAC table calculated from this are representative for the resulting transmission signal (28) of a radar measurement chirp only if, after each individual transmission frequency is set, a steady state is reached in that case as well with regard to the tuning voltage and the resulting VCO frequency. This is fulfilled for the transmission signal of slow chirps shown in FIG. 2. For the fast chirps in accordance with FIG. 4, this analogy may no longer apply. Fast cycling through the tuning voltage range or the corresponding VCO frequency range can prevent a steady state from being reached.

Therefore, it is desirable to have an alternative calibration concept that provides frequency counts directly based on fast chirps. To measure all transient effects that result when passing through fast chirps for the curve of the tuning voltage, the same tuning voltage or VCO frequency response curve is suggested for a calibration cycle as in regular radar measurement cycles. Thus the frequency response curve corresponds exactly to the curve shown in FIG. 4, but in the calibration cycle, an attempt is made to use the means of frequency counting to detect the actual curve of the frequency within multiple fast chirps and, if necessary, to adapt the basic high-rate digital sequence.

Figure 6:
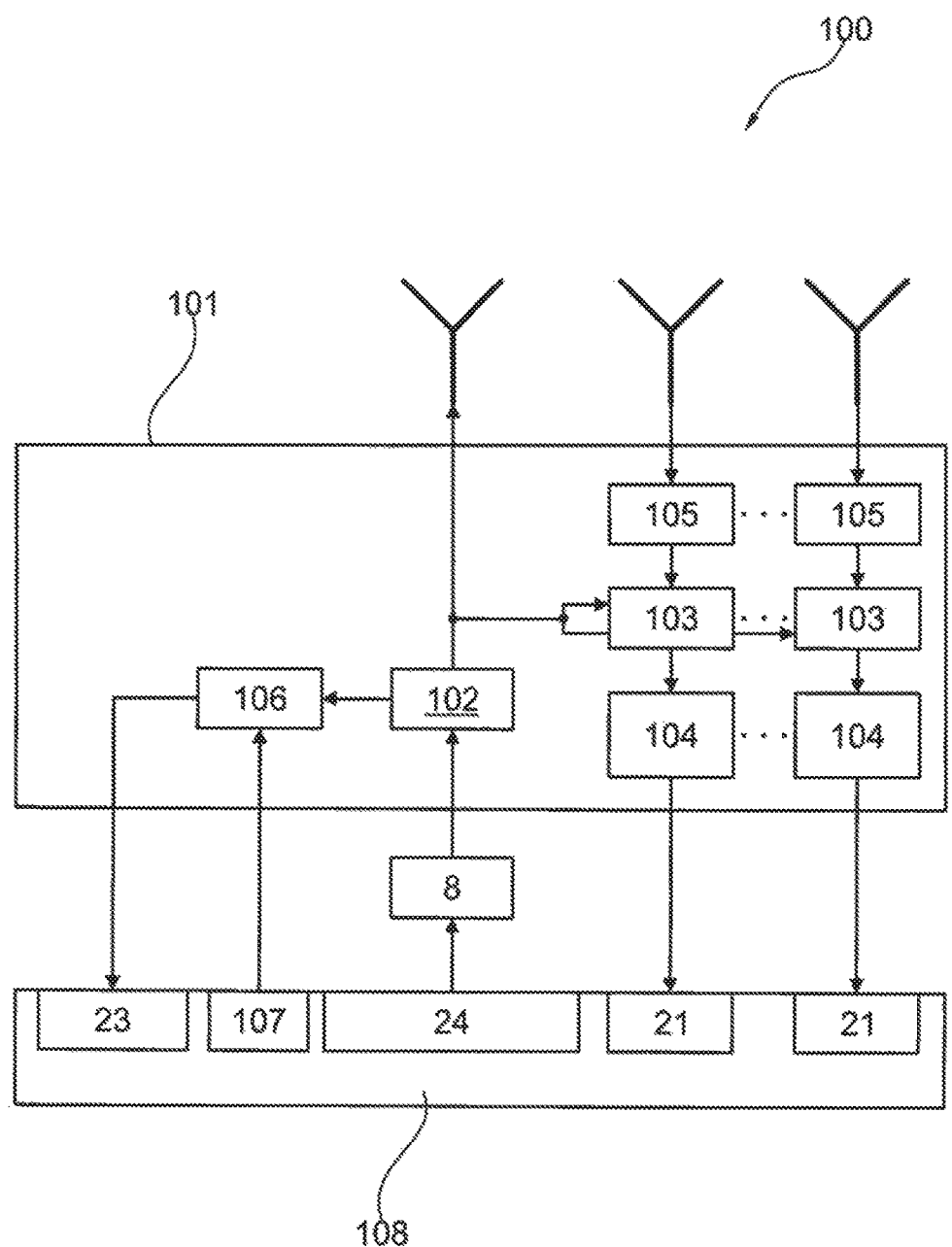
FIG. 6 is a schematic diagram of an inventive radar device.

The radar device 100 for the suggested procedure is an innovative MMIC 101 (Monolithic Microwave Integrated Circuit), as it is used in FIG. 6. In this MMIC 101, in addition to the actual 24 GHz-VCO oscillator (102), all other relevant 24 GHz components are integrated, such as the mixers (103), the bandpass filters (104), the LNAs or amplifiers (105) and the frequency divider (106).

The MMIC is configurable via an SPI interface (107) of the digital signal processor (108). In particular, the SPI interface (107) enables the integrated frequency divider (106) to be switched between two different division factors. As described above, an initial division factor (for example of $2^{20}=1048576$) enables the 24 GHz signal to be divided down to a signal with a frequency of approximately 23 kHz. The existing concept of the counting of constant frequencies is based on this configuration. It provides for setting constant 24 GHz frequencies for approximately 1 ms as well as counting ten successive cycle durations of the divided-down 23 kHz signal, in a similar fashion as described further above.

Alternatively, with the use of the innovative MMIC (101) in a radar device, a second division factor of $2^{14}=16384$ can be configured. This results in a frequency divider output signal with a frequency of approximately 1.47 MHz. A measurement signal with this frequency provides the great advantage of a significantly reduced measurement time of approximately $\Delta_{TM}=0.68$ µs$=1/1.474$ MHz. This results in the chronological resolution, with which the frequency response curves can be measured within the sequence of fast chirps in accordance with FIG. 4. On the other hand, the relative accuracy of an individual measurement is significantly less. Because a counting unit with a cycle of 200 MHz is used in the radar devices, for the measuring time of $\Delta_{TM}$, this results in a relative accuracy of $(1/200$ MHz$)/\Delta_{TM}=7.353*10^{-3}$. With respect to the system center frequency of 24.15 GHz, this results in an absolute accuracy of 177.57 MHz. This shows that an acceptable level of accuracy is possible only by means of a suitable combination of a large number of individual measurements. However, the short duration of an individual measurement makes this exact method possible.

Figure 7:
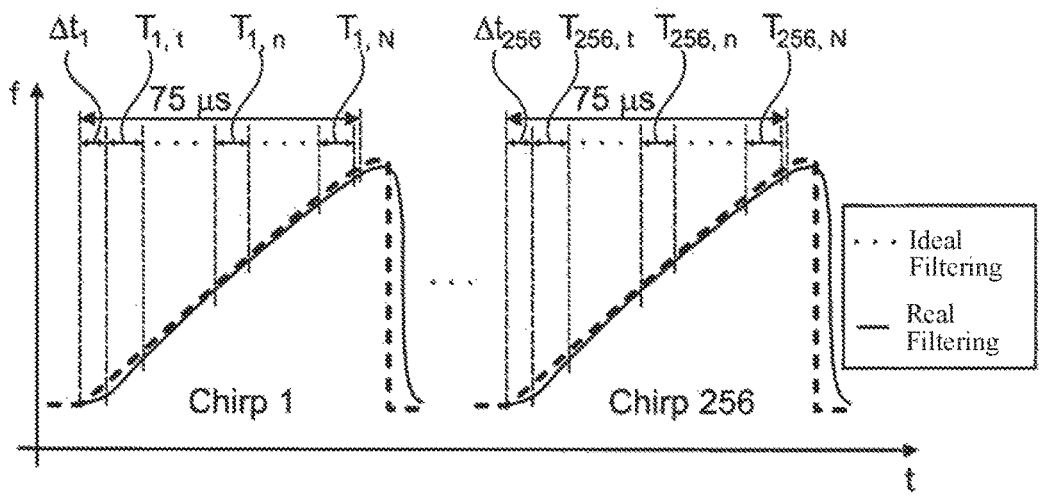
FIG. 7 is a diagram for explaining the invention.

For this, FIG. 7 shows a detailed curve of a transmission frequency and its metrological measurement. FIG. 7 shows the measuring relationships in realistic form. The solid describes the smoothed curve of the transmission frequency through the low-pass filtering of the tuning voltage described in FIG. 5 without precorrection for Chirp 1 and Chirp 256. This curve is also called "real filtering".

The dotted-line curve shows the linear frequency response curve resulting from an ideal filtering, which, however, cannot be attained. The significantly more visible settling behavior of the real frequency response curve results from the cutoff frequency of the low-pass filter (26) shown in FIG. 5 for the VCO tuning voltage, which must be in the 100 kHz range to attain adequate suppression of the 100 MHz cycle frequency of the high-rate digital signal at the input of the filter.

Due to the cutoff frequency of the filter, the settling time is in the 10 µs range. This permits an initial measure to increase the accuracy of the frequency measurement. The measuring time $T_{m,n}$ shown in FIG. 7 of the m-th fast chirp at position n is selected for $5*\Delta T_M$ and thus increases to approximately 3.4 μs. This means that instead of a cycle duration measurement of the frequency divider output signal being determined, the sum of five successive cycle durations is measured. Though the absolute accuracy of this measurement remains at about 1/200 MHz, the relative accuracy improves to $(1/200\ \text{MHz})/(5*\Delta T_M)=1{,}471*10^{-3}$. Relative to the system center frequency of 24.15 GHz, this results in an absolute accuracy of such an individual measurement improved to 35.51 MHz.

Although a frequency calculated over this measurement time is only an average value across the specified interval, the higher settling time of the transmission time filter means that the transmission frequency response curve can be assumed to be strictly monotonic and thus the cycle durations to be measured can be assumed to be within the measurement time. This in turn enables, to a reliable degree, the assumption that the average frequency thus calculated is in the middle of the measurement interval as the momentary frequency.

In addition to the calculated frequency of the m-th chirp at the n position, its chronological position can be determined based on a counter, which is started at the beginning of each fast chirp and incremented at the cycle rate of 100 MHz. At the time of the first edge of the frequency counter signal, which triggers the first measurement interval $T_{m,1}$ of the m-th chirp, the counter value corresponds to the period $\Delta t_m$. Relative to the beginning of the chirp, this results in the chronological positions $t_{m,n}$ of the calculated frequencies $f_{m,n}$:

$$t_{m,n}=\Delta tm+\text{Summe von } i=1 \text{ bis } n-1(Tm,l)+0.5Tm,n$$

Here, note that the respective periods $\Delta t_m$ vary for different chips, because the phase positions of the 24 GHz signal and thus also that of the frequency counter derived therefrom are asynchronous with the start times of the chirps generated in the digital signal processor.

To maximize the number of frequency measurements within a fast chirp, overlapping measurement intervals are used so that the measured frequencies of the m-th chirp $f_{m,n}$ are separated by $\Delta T_M=0.68$ ps. For a chirp length of 75 μs, this results in a number of frequencies of approximately 110 with an accuracy of 35.51 MHz each.

Figure 8:
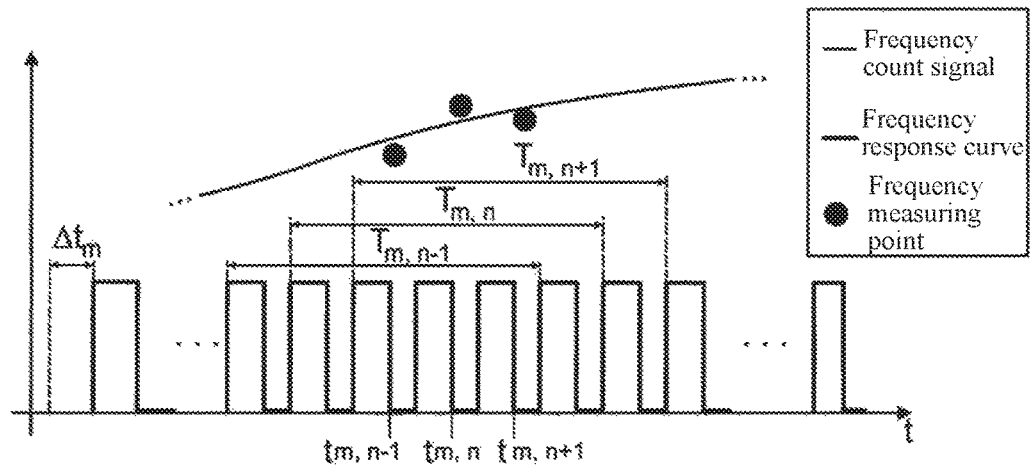
FIG. 8 is a diagram for explaining the invention.

FIG. 8 illustrates this principle. The figure depicts the frequency counter signal in the form of a rectangular signal, while the frequency response curve is in the form of a rising signal. Thus, the frequency count signal and the measurement intervals derived therefrom result in the frequency measurement points of a fast chirp.

Here, note that the frequency errors of neighboring measurement intervals are independent of each other despite their overlapping, because, for this purpose, only the measurement of the edges of the measurement signal at the beginning and end of the corresponding measurement interval are relevant. This is also demonstrated by FIG. 8.

An additional step to increase the accuracy when detecting the frequency response curve within a fast chirp is the suitable combination in each case of all individual frequency measurement points of all 256 fast chirps. This means that the number of frequency measurement points is 110*256=28160. In addition to the frequency measured with an accuracy of 35.51 MHz, the chronological position $t_{m,n}$ of the n-th frequency measurement point of the m-th chirp can also be allocated to the corresponding value of the internal DAC table, which is relevant for transmission signal generation at this point. This results in frequency measurement points of the form $(DAC_{m,n}\ f_{m,n})$.

This number of measurement points can be used in a wide variety of ways to calculate an updated DAC table that corresponds with sufficient accuracy to the desired linear frequency response curve.

For example, using a cubic regression, a function can be calculated from the number of individual frequency measurement points. This function returns the equivalent DAC value as a function of the desired frequency. A third-degree polynomial would then have the following appearance:

$$DAC=A*f^3+B*f^2+C*f+D$$

The regression coefficients A, B, C and D can then be determined from the frequency measurement points according to the familiar method. In doing so, the increase in accuracy of the measurement of the curve is obvious due to the large number of individual measurements. As an approximation, we can specify the factor sqrt(N*M) here. For the concrete example being examined here, this results in an improvement by the factor 167.8 to approximately 212 kHz for the calculated curve.

Thus, the accuracy with respect to the bandwidth of 200 MHz is approximately one-tenth of a percent. Thus, it is sufficient for using a new measurement of the curve or the coefficients A, B, C and D to calculate an updated DAC table and thus a new high-rate bit sequence, which compensates for the nonlinearities that have been inherent up to this point.

It is important to note that the described compensation does not extend solely to the transients of the transmission filter, but that the nonlinearity of the VCO curve is also detected and compensated for correspondingly.

REFERENCE NUMERAL LIST

1 Radar device
2 Transmit branch
3 Receive channel
4 Receive channel
5 Transmit signal
7 Oscillator
8 Digital-analog converter
9 Mixer
10 Mixer
11 LO signal
12 Receive antenna
13 Receive antenna
14 Signal
15 Signal
16 Amplifier
17 Amplifier
18 Filter
19 Filter
20 Digital signal processor
21 Analog-digital converter
22 Frequency divider
23 Frequency counter
26 Low-pass filter
27 Oscillator, VCO
28 Transmit signal
29 Digital signal
30 Tuning voltage
100 Radar device
101 MMIC
102 Oscillator
103 Mixer
104 Filter and amplifier
105 Amplifier
106 Frequency divider 107 SPI interface
108 Signal processor

The invention claimed is:

1. A radar device for transmitting a signal in a frequency range, said radar device comprising:
   a control system;
   a voltage-controlled-oscillator (VCO) having an input and an output;
   a digital-analog converter (DAC) for generating a tuning voltage to tune the VCO, the DAC connecting the input of the VCO to the control system, wherein the DAC includes a DAC table of values for conversion into the tuning voltage;
   a transmission antenna connected to the output of the VCO;
   at least one receive channel for receiving, processing, and forwarding a receive signal to the control system, wherein the receive channel includes:
      at least one receive antenna; and
      a mixer connected to the output of the VCO for mixing the receive signal with the signal at the output of the VCO;
   a frequency counter for counting frequencies of the signal over the frequency range; and
   a frequency divider for feeding signals from the VCO to the frequency counter;
   wherein the VCO can be activated by the control system to generate the signal;
   wherein the values of the DAC table can be regularly updated during a calibration cycle of the radar device by approximating, from the frequencies counted by the frequency counter, a nonlinear VCO curve describing a relationship between a set value from the DAC table and the frequency of the signal generated by the VCO tuned by the tuning voltage converted from the set value; and
   wherein the VCO and the frequency divider are designed as a monolithic microwave integrated circuit.

2. The radar device in accordance with claim 1, wherein at least one mixer of a receive channel continues to be integrated into the monolithic microwave integrated circuit.

3. The radar device in accordance with claim 1, wherein at least one mixer and/or filter of a receive channel continues to be integrated into the monolithic microwave integrated circuit.

4. The radar device in accordance with claim 1, wherein during the calibration cycle the frequency counter detects the frequency of the signal during a radar measurement cycle and the control system updates the values of the DAC table for generating the tuning voltage to be the same as in the radar measurement cycle.

5. The radar device in accordance with claim 4, wherein the signal includes a plurality of chirps with a high gradient, and wherein during the calibration cycle the frequency counter detects the frequency of the signal within two or more chirps of the plurality of chirps.

6. The radar device in accordance with claim 1, wherein a control system is provided for control of the integrated frequency divider between at least two different division factors.

7. The radar device in accordance with claim 6, wherein the control takes the form of an interface of a digital signal processor.

8. A procedure for operating the radar sensor of claim 1, wherein for calibration using a frequency count from the frequency counter, at least one of the same tuning voltage and the same VCO frequency response curve as a regular radar measurement cycle is implemented during the calibration cycle.

* * * * *